United States Patent Office 3,222,343
Patented Dec. 7, 1965

3,222,343
PROCESS FOR PRODUCING FLAT PARTICLES OF POLYMERS OF VINYL AROMATIC MONOMERS
Alvin R. Ingram, Murrysville, and Hans Wolfgang Jurgeleit, Pittsburgh, Pa., assignors to Koppers Company, Inc., a corporation of Delaware
No Drawing. Filed Dec. 12, 1961, Ser. No. 158,901
5 Claims. (Cl. 260—93.5)

This invention relates generally to a process of polymerizing vinyl aromatic monomers in aqueous suspension, and more specifically, to an advance in the art of the suspension polymerization of polystyrene whereby flattened particles of polystyrene may be obtained.

Suspension polymerization is a known process in which a polymerizable liquid monomer is dispersed with a suspending agent in a continuous aqueous suspending medium and is polymerized while so suspended. Known methods for polymerizing vinyl aromatic monomers in aqueous suspension employ any one of a plurality of suspending agents, such as, the protective colloids (e.g., starch, natural gums, alginates, glycol cellulose, glue, gelatin, polyvinyl alcohol, etc.) and the finely divided inorganic solids (e.g., kaolin, bentonite clay, barium sulfate, etc.). Such suspending agents are generally incorporated into an aqueous liquid and the vinyl aromatic monomer is dispersed therein by stirring. The average particle size of the droplets in dispersion is inversely proportional to the speed or intensity of agitation. The suspension is heated until polymerization occurs and beads are formed.

The beads that have been formed when these vinyl aromatic monomers are polymerized by suspension polymerization have heretofore been spherical. Spherical beads have presented a number of disadvantages. For example, spherical beads, when fed into an extruder, are subject to slow and inconsistent feeding, and in injection molding machinery, the beads trickle through the "weigh feeders." Also, any beads falling on the floor become extremely dangerous because they roll when stepped upon thereby causing hazardous working conditions. To cure these defects, the spherical-shaped beads have heretofore been subjected to a costly processing step wherein they are pelletized into non-spherical shapes.

Non-spherical beads or particles have occasionally been formed heretofore. However, these non-spherical particles have been curiosities; it has not been known what steps must be performed in order to achieve consistent results in forming uncontaminated, non-spherical particles. Generally, the formation of non-spherical particles has been associated with a suspension that is on the verge of failure and thus the non-spherical particles have occluded therein an objectionable quantity of water and dispersing agent.

It is an object of this invention to provide a consistent method for directly forming flat particles from unsaturated organic compounds in a suspension polymerization whereby the objections to the use of spherical beads and the costly pelletizing step are eliminated.

Other objects and advantages will be evident in the following description of the invention.

According to this invention, vinyl aromatic monomers are subjected to suspension polymerization, the monomers being suspended by the use of a synergistic suspending agent (hydroxyethyl cellulose and alkali metal phosphate) while the mass is maintained at a pH of between 5.0 and 7.5. Non-spherical particles having no objectionable quantities of occluded extraneous matter are thereby consistently produced.

Vinyl aromatic monomers useful in this invention are, in general, any monomeric compound containing the radical $CH_2=C$. These compounds may be, for example, vinyl substituted aryl compounds such as styrene, alpha-methyl styrene, ortho-chlorostyrene, para-chlorostyrene, and various polymerizable polychlorostyrenes and their copolymers.

One of the specific suspending agents which must be used is hydroxyethyl cellulose. Preferably a low molecular weight hydroxyethyl cellulose is employed. A hydroxyethyl cellulose which may be used is one sold by Union Carbide Corporation under the trademark "Cellosize WP-09." Under normal conditions, hydroxyethyl cellulose yields spherical beads as does all other suspending agents now in general use. We have now found that by using hydroxyethyl cellulose in quantities which would be insufficient to produce a suspension and by adding a secondary synergistic suspending agent, non-spherical particles are consistently formed.

The alkali metal phosphate may be any one of a number of compounds which meet the requirement that the pH of an aqueous 1% solution thereof is greater than 8.5, and wherein the alkali metal phosphate is an alkali metal salt of the acid

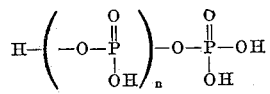

wherein $n$ is an integer having a value of from zero to five, such as tetrasodium pyrophosphate, sodium tripolyphosphate, sodium hexametaphosphate, and disodium phosphate, all of which are commercially available. A preferred alkali metal phosphate is tetrasodium pyrophosphate.

The amount of hydroxyethyl cellulose which is used is critical in the production of flat non-spherical beads. There must be less hydroxyethyl cellulose than that quantity which would normally be adequate to suspend the polymer, but in general, a hydroxyethyl cellulose concentration based on parts by weight in relation to the weight of 100 parts of the vinyl aromatic monomer of above 0.05 to about 0.12 is necessary. If larger amounts of hydroxyethyl cellulose are used, the result will be the production of spherical beads rather than flat beads. The polystyrene will precipitate if the concentration of the hydroxyethyl cellulose is 0.05 or less. The alkali metal phosphate compound is utilized in parts by weight of the vinyl aromatic monomer of about 0.025 to 0.10. The ratio of the monomer to the synergistic agent in parts by weight must be 1:0.00075 to 1:0.0022 respectively, and the synergistic agent must comprise hydroxyethyl cellulose and sodium phosphate in the ratio 1:0.2 to 1:2 respectively.

When using these two synergistic suspending agents in the above indicated amounts, flat particles are formed which are translucent and yield optically clear films and injection moldings. The particles, in order to be flat enough to eliminate the objections to spherical beads must have a flatness index of at least 1.5. The flatness index is defined as the width or diameter of the particle divided by the thickness. Diameter is used when the particles are disc shaped, and width is used when they are elongated. To form clear moldings, the particles when removed from the suspension must have an internal water content of 2% or less.

Another important parameter of the invention is that the pH be maintained between about 5.0 and 7.5. If the pH falls below about 5.0, the suspension may fail. When the pH is increased above about 7.5, spherical beads tend to be formed.

In operation, a vinyl aromatic monomer, such as styrene, and a polymerization initiator are charged into a reactor at room temperature, and therein they are agitated. Then water, hydroxyethyl cellulose, and the secondary synergistic suspending agent are added without agitation. The mixture is left at rest for a short period, and then agitation is resumed and the mixture is heated to the optimum temperature for the particular initiator for a time sufficient for the conversion of the polymer to exceed 95%. A convenient polymerization initiator may be a mixture of benzoyl peroxide and t-butyl perbenzoate. The particles resulting vary in size from about $\frac{1}{16}$ to $\frac{1}{2}$ inch diameter and appear to be particles which have been flattened in varying degree. The departure from sphericity increases with increases in diameter. Depending on unknown factors peculiar to certain modes of agitation, the flat beads may be more or less elongated.

We have also found that the hydroxyethyl cellulose need not be initially added to the suspension. In this event the vinyl aromatic monomer, a polymerization initiator, an alkali metal phosphate, and water are charged into a reactor and a suspension is mechanically induced. The mechanical suspension is then heated and hydroxyethyl cellulose is added before the monomer is 50% converted. The polymerization is then completed. If the conversion of the monomer is carried out to 50–60% completion before the hydroxyethyl cellulose is added, the particles will tend to occlude too high a percentage of water.

The following examples are given in order to illustrate, but not to limit, the invention. In the following examples, the polymerizations of vinyl aromatic monomers to form non-spherical beads is illustrated. All parts are parts by weight unless otherwise indicated.

*Example I*

100 parts of styrene, 0.2 part of benzoyl peroxide, and 0.05 part of t-butyl perbenzoate were charged at room temperature under agitation into a one-hundred gallon Pfaudler glass-lined reactor. The agitation was then stopped and 100 parts of water, 0.1 part of low molecular weight hydroxyethyl cellulose and 0.025 part of tetrasodium pyrophosphate were charged into the reactor. The low molecular weight hydroxyethyl cellulose used was "Cellosize WP-09" sold by Union Carbide Corporation. The mixture was left at rest for ten minutes. Agitation was then resumed. The mixture was slowly heated over a period of 1½ hours to 92° C., and the mixture was maintained at 92° C. for 7½ hours. The temperature of the mixture was then raised gradually over a period of 48 minutes to 115° C., and the mixture was maintained at this temperature for 4 hours. The agitator used was a horizontally aligned Pfaudler three-bladed retreating impeller revolving at 105 r.p.m.

Measurements of the acidity made throughout the polymerization showed the initial pH to be 8.0 and subsequent readings were as follows:

| Hours: | pH |
|---|---|
| 1.0 | 6.0 |
| 2.0 [1] | 5.0 |
| 3.0 | 6.8 |
| 4.0 | 6.4 |
| 4.5 | 6.0 |
| 5.5 | 6.0 |
| 7.5 | 6.0 |

[1] At this point to maintain the pH above 5.0, an additional 0.005 part of tetrasodium pyrophosphate was added.

By the end of the polymerization period, the polystyrene had been formed into particles which were slightly elongated. The wet particles had an internal water content of 2%.

*Example II*

100 parts of styrene, 0.2 part of benzoyl peroxide, and 0.05 part of t-butyl perbenzoate were charged at room temperature under agitation into a one-hundred gallon Pfaudler glass-lined reactor. The agitation was then stopped and 100 parts of water, 0.1 part of "Cellosize WP-09" and 0.05 part of tetrasodium pyrophosphate were charged into the reactor. The mixture was left at rest for ten minutes. Agitation was then resumed, and the mixture was slowly heated over a period of 1½ hours at 92° C. The mixture was maintained at 92° C. for 7½ hours. The temperature of the mixture was then raised over a period of 45 minutes to 115° C. and maintained at this temperature for 4 hours. The agitator was a horizontally aligned Pfaudler three-bladed retreating impeller revolving at 105 r.p.m.

Measurements of the acidity were made throughout the polymerization. Initially, the pH was 8.8. The pH at subsequent times were as follows:

| Hours: | pH |
|---|---|
| 1.0 | 7.4 |
| 2.0 | 7.1 |
| 3.0 | 6.5 |
| 4.0 | 6.0 |
| 5.5 | 5.5 |

By the end of the polymerization period, the polystyrene had been formed into flat particles which were round or slightly elongated. The wet particles had an internal water content of 1.4%.

*Example III*

100 parts of styrene, 0.2 part of benzoyl peroxide, and 0.05 part of t-butyl perbenzoate were charged into a one-hundred gallon Pfaudler glass-lined reactor, and the mixture was agitated during the charging. The agitation was then stopped and 100 parts of water, 0.075 part of "Cellosize WP-09" and 0.05 part of tetrasodium pyrophosphate were charged into the reactor. The mixture was left at rest for ten minutes. Agitation was resumed, and the mixture was slowly heated to 92° C. during a period of 1½ hours and then maintained at 92° C. for 7½ hours. The temperature of the mixture was then raised over a period of 45 minutes to 115° C. and maintained at this temperature for 4 hours. The agitator was a horizontally aligned Pfaudler three-bladed retreating impeller revolving at 105 r.p.m.

Measurements of the acidity were made throughout the polymerization. Initially, the pH was 7.5 and subsequent readings were as follows:

| Hours: | pH |
|---|---|
| 1.5 | 7.0 |
| 2.5 | 6.8 |
| 3.5 | 6.8 |
| 4.5 | 6.4 |
| 5.5 | 6.4 |
| 6.5 | 6.6 |
| 7.5 | 6.4 |

At the end of the polymerization period, the polystyrene had been formed into flat particles which were round or slightly elongated. The wet particles had an internal water content of 1.7%.

The size of the non-spherical particles which were obtained by the examples set forth above are shown in Table I.

TABLE I.—PREPARATION OF FLAT PARTICLES IN 100 GALLON REACTOR

| Example | Suspending Agent "Cellosize WP-09" Parts | Tetrasodium Pyrophosphate Parts | Size of non-spherical particles U.S. Standard Screen | | | |
|---|---|---|---|---|---|---|
| | | | On 4 | On 8 | On 16 | Through 16 |
| I | 0.10 | 0.03 | 25 | 72 | 1 | 2 |
| II | 0.10 | 0.05 | 1 | 51 | 32 | 16 |
| III | 0.075 | 0.05 | 46 | 53 | <1 | <1 |

The shape of the particles obtained in the Examples I–III is described in Table II.

TABLE II.—SHAPE OF PARTICLES

| Example | Average Thickness, inches | Average Width, inches | Average Length, inches | Ratio of Thickness: Width: Length | Flatness Index Width/ Thickness | Elongation Index Length/ Width |
|---|---|---|---|---|---|---|
| I | 0.095 | 0.20 | 0.32 | 1:2.1:3.4 | 2.1 | 1.5–1.7 |
| II | 0.085 | 0.14 | 0.15 | 1:1.6:1.7 | 1.6 | 1.0–1.1 |
| III | 0.12 | 0.23 | 0.26 | 1:1.9:2.2 | 1.9 | 1.1–1.3 |

The non-spherical beads were rinsed free of hydroxyethyl cellulose, dried to a water content of less than 0.02% and then tested for their molding and filming properties. In one test, they were converted to film by blowing a bubble of molten polymer by compressed air under conditions such as are ordinarily used with beads which have been pelletized. The flat beads fed smoothly and formed a film which was clear, crisp and sparkling.

In another test, the flat beads were injection molded and compression molded, in each instance yielding optically clear moldings under typical molding conditions. There was no problem of slow or inconsistent feeding, or of trickling through "weigh feeders" in the injection molding machine. Flat beads falling on the floor presented no hazard to the operators of the processing equipment.

*Example IV*

100 parts of styrene, 0.2 part of benzoyl peroxide, and 0.05 part of t-butyl perbenzoate were charged into a one-hundred gallon Pfaudler glasslined reactor and the mixture was agitated during the charging. Agitation was then stopped and 100 parts of water, 0.05 part of "Cellosize WP-09" and 0.10 part of tetrasodium pyrophosphate were charged into the reactor. The mixture was left at rest for ten minutes and then agitation was resumed. The mixture was slowly heated during a period of 1½ hours to 92° C. and was maintained at 92° C. for 3 hours at which time the styrene precipitated, thus causing failure of the polymerization. No beads or flat particles were formed. Apparently, the failure was due to the marginal amount of hydroxyethyl cellulose present in the reaction mixture.

*Example V*

The steps of Example I were followed with the exception that no alkali metal phosphate was used. The result was that 75% of the monomer coated the agitator and the walls of the vessel. The remaining 25% of the monomer was formed into particles of irregular shapes and sizes, the majority of these particles being larger than one-half inch.

*Example VI*

The process of Example I was repeated using 0.2 part "Cellosize WP-09" and 0.075 part of tetrasodium pyrophosphate. The result of this run was that 90% of the particles were in the form of spherical beads. The size of the spherical beads were such that they passed through a 10 mesh screen and were retained on a 25 mesh screen.

*Example VII*

The process of Example I was carried out using 0.15 part "Cellosize WP-09" and 0.075 part of tetrasodium pyrophosphate. In the resultant particles, 20% were in the form of flat, round particles which were retained on a 12 mesh screen and 80% were spherical. The spherical beads passed through a 12 mesh screen and were retained on a 25 mesh screen.

*Example VIII*

The steps of Example I were carried out using 0.08 part "Cellosize WP-09" and 0.02 part of tetrasodium pyrophosphate. The result was that 10% of the monomer coated the agitator and the remainder of the monomer formed discs of large size, which discs agglomerated in multiples of 2–4 particles per agglomerate. Several of the particles were misshapen. For example, tear-drop shaped particles were formed.

*Example IX*

The process of Example I was followed using 0.08 part of "Cellosize WP-09" and 0.15 part of tetrasodium pyrophosphate. One-third of the particles which were formed were spherical particles which passed through an 8 mesh screen and were retained on a 12 mesh screen. The remaining two-thirds of the particles were only slightly flattened.

To illustrate the formation of flat particles using an initial mechanical suspension and a subsequent addition of hydroxyethyl cellulose to form a stable suspension, we performed the following example:

*Example X*

The following mixture was charged into a reactor: 100 parts of styrene, 0.2 part of benzoyl peroxide, 0.05 part of t-butyl perbenzoate, 0.05 part of tetrasodium pyrophosphate, and 100 parts of water. The above reactants were heated to 92° C. during a 1½ hour period and were then heated at 92° C. for 2½ hours. At this time, 0.1 part "Cellosize WP-09" was added and the polymerization continued according to the following schedule: at 92° C. for 5 hours, to/at 115° C. for 0.75/4 hours. The styrene was converted to polystyrene particles in better than 99% yield. The product was in the form of large, flat particles of diameter ⅛ to ⅜ inch. These were separated by centrifuging, water washed and dried. When injection molded, the polystyrene particles gave A.S.T.M. properties equivalent to those obtained by molding polystyrene pellets. By using polystyrene particles instead of pellets for crystal molding, the cost of the pelletizing process was saved.

Non-spherical particles may also be impregnated with n-pentane and dusted with sodium bicarbonate and citric acid to make foam film. In order to demonstrate this procedure, the following example was performed:

Example XI

The process of Example I was carried out until 80% conversion of the monomer had taken place. At this time, an additional 0.15 part of "Cellosize WP-09" was added to the mixture. Nine parts of pentane was then added incrementally over a period of 90 minutes, while the mixture was maintained at 92° C. The temperature was then raised to 115° C. and the conversion was completed to 99.7%. The particles were separated from the system, rinsed with water, and dried at a temperature of about 50° C. at atmospheric pressure. After drying, the particles were dusted with 0.4 part citric acid hydrate and 0.5 part sodium bicarbonate. This mixture was extruded in a conventional plastic extruder at a temperature of 160° C. A foamed polystyrene having uniform small voids was obtained.

The foregoing describes the preferred embodiment of the invention, but it should be understood that various modifications may be made therein within the spirit and scope of the appended claims.

We claim:

1. A method for the production of non-spherical polymer particles which comprises:
    (a) suspending one part by weight of a vinyl aromatic monomer and a polymerization initiator in an aqueous medium with from 0.00075 to 0.0022 part of a synergistic agent comprising hydroxyethyl cellulose and an alkali metal phosphate, the ratio of said hydroxyethyl cellulose to said alkali metal phosphate being between 1:0.2 and 1:2.0,
    said alkali metal phosphate comprising a sodium salt of the acid

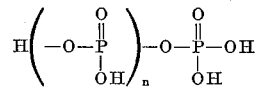

wherein $n$ is an integer having a value of from zero to five and the pH of an aqueous one percent solution of said sodium salt is greater than 8.5,
    (b) agitating said suspension, and
    (c) simultaneously heating said suspension to cause polymerization of said monomer, and
    (d) maintaining the pH of the mixture between about 5.0 and 7.5, whereby non-spherical particles of polymer are formed said particles being between about $\frac{1}{16}$ and $\frac{1}{2}$ inch in diameter and having a flatness index of at least 1.5.

2. The method of claim 1 wherein the alkali metal phosphate is selected from the group consisting of tetrasodium pyrophosphate, sodium tripolyphosphate, sodium hexametaphosphate, and disodium phosphate.

3. A method for the production of flat polystyrene particles which comprises:
    (a) mixing styrene with a polymerization initiator and water,
    (b) adding to said mixture a synergistic suspending agent comprising:
        (1) one part by weight of hydroxyethyl cellulose and
        (2) 0.2 and 2.0 parts by weight of tetrasodium pyrophosphate,
    (c) said synergestic suspending agent being present in an amount between 0.00075 and 0.0022 part per part of styrene,
    (d) agitating said mixture,
    (e) simultaneously heating said mixture to polymerize said styrene, and
    (f) maintaining the pH of the mixture between about 5.0 and 7.5, whereby flat polystyrene particles are formed said particles being between about $\frac{1}{16}$ and $\frac{1}{2}$ inch in diameter and having a flatness index of at least 1.5.

4. A method for the production of non-spherical particles which comprises the steps of:
    (a) suspending a vinyl aromatic monomer and a polymerization initiator in an aqueous medium with a synergistic suspending agent comprising:
        (1) hydroxyethyl cellulose and
        (2) tetrasodium pyrophosphate
    (b) said hydroxyethyl cellulose being present in an amount between about 0.05 to 0.12 percent by weight of the styrene, and said tetrasodium pyrophosphate being present in an amount between about 0.025 and 0.10 percent by weight
    (c) agitating and simultaneously heating said suspension,
    (d) while maintaining said suspension at a pH of between about 5.0 and 7.5 until the vinyl aromatic compound polymerizes,
    (e) whereby non-spherical particles of polymerized vinyl aromatic monomer are formed, said particles being between about $\frac{1}{16}$ and $\frac{1}{2}$ inch in diameter and having a flatness index of at least 1.5.

5. The method of claim 4 wherein the vinyl aromatic monomer is styrene.

References Cited by the Examiner

UNITED STATES PATENTS

| | | | |
|---|---|---|---|
| 2,524,627 | 10/1950 | Hohenstein | 260—93.5 |
| 2,594,913 | 4/1952 | Grim | 260—93.5 |
| 3,061,561 | 10/1962 | Kahrs et al. | 260—17 |

FOREIGN PATENTS 1,029,565  5/1958  Germany.

JOSEPH L. SCHOFER, *Primary Examiner.*